(12) United States Patent
Tada et al.

(10) Patent No.: US 6,636,805 B1
(45) Date of Patent: Oct. 21, 2003

(54) NAVIGATION SYSTEM, REMOTE NAVIGATION DEVICE AND METHOD, AND IN-VEHICLE NAVIGATION DEVICE

(75) Inventors: Akihito Tada, Toyota (JP); Hironobu Sugimoto, Toyota (JP); Masayuki Yurimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 88 days.

(21) Appl. No.: 09/704,665

(22) Filed: Nov. 3, 2000

(30) Foreign Application Priority Data

Nov. 18, 1999 (JP) ............................. 11-328391
Sep. 21, 2000 (JP) ........................ 2000-287078

(51) Int. Cl.$^7$ ............................................. G01C 21/00
(52) U.S. Cl. .................... 701/209; 701/200; 701/202; 701/208; 340/990; 340/995; 73/178 R
(58) Field of Search ................................. 701/200, 201, 701/202, 207, 208, 209, 211; 340/945, 990, 995; 73/178 R (56) References Cited

U.S. PATENT DOCUMENTS 6,249,740 B1 * 6/2001 Ito et al. ..................... 701/200

FOREIGN PATENT DOCUMENTS

| JP | A-9-178499 | 7/1997 |
|----|------------|--------|
| JP | 2000-018955 | 1/2000 |
| JP | 2000-123295 | 4/2000 |

* cited by examiner

Primary Examiner—Thomas G. Black
Assistant Examiner—Arthur D. Donnelly
(74) Attorney, Agent, or Firm—Oliff & Berridge, PLC (57) ABSTRACT

A remote navigation device and navigation system which can reduce communications costs by minimizing route guidance data transmitted to an in-vehicle navigation device is configured so that it can obtain guide area information specifying areas where guidance is not needed. When generating route guidance data to be transmitted to an in-vehicle navigation device, the remote navigation device removes the routes which pass through areas where route guidance is not needed, and generates route guidance data for just the other routes. By transmitting only such route guidance data to the in-vehicle navigation device, the amount of transmitted data can be reduced.

21 Claims, 6 Drawing Sheets

NAVIGATION SYSTEM, REMOTE NAVIGATION DEVICE AND METHOD, AND IN-VEHICLE NAVIGATION DEVICE

BACKGROUND OF THE INVENTION

1. Field of the Invention

The present invention relates to a navigation system, remote navigation device and method, and an in-vehicle navigation device, and in particular to an art for reducing communications costs by reducing the amount of data in route guidance data transmitted from a remote navigation device to an in-vehicle navigation device.

2. Description of the Related Art

In recent years, GPS (Global Positioning System) navigation devices have come to be popularly installed in passenger cars and other motor vehicles. A typical in-vehicle navigation device includes an in-vehicle map database (DB) which uses a CD-ROM or a DVD (Digital Video Disk) to enable route guidance display based on the in-vehicle map DB. However, it can not be expected that data for the in-vehicle map DB included in-vehicle navigation devices will be frequently updated and there cases where route guidance for newly established road or facility cannot be executed should be expected. Because of this, attention has been given to systems in which route guidance is executed at the in-vehicle navigation device based on a most recent map, by providing, in addition to the in-vehicle navigation device, a remote navigation device in the form of a route guidance center or the like outside the vehicle, such that route guidance data can be transmitted from the remote navigation device to the in-vehicle navigation device. According to such a system, by updating only the map data at the remote navigation device, route guidance can be executed based on recent map without requiring frequent updates to the in-vehicle map DB.

In the above-mentioned system, an in-vehicle navigation device transmits its current position and destination to a remote navigation device, and requests transmission of route guidance data. In response, the remote navigation device searches routes based on the most recent map and returns the search result to the in-vehicle navigation device.

However, when route guidance data is transmitted for all possible guided routes from the current position to the destination, route guidance data which is not actually needed by the user would also be transmitted. For example, a user would most likely be familiar with the roads near their home, and would therefore not need route guidance by the navigation system in that area. However, in the related art systems, when the area around a user's home is included in the route guidance from the current position to the destination, the same route guidance is provided as for other areas, resulting in a problem that excessive route guidance data is transmitted from the remote navigation device to the in-vehicle navigation device.

In addition to the area around a user's home, it is also generally true that a user does not need route guidance by the navigation system for other roads that the user frequently travels on. Therefore, it is desirable to reduce the total amount of data in the route guidance data, and consequently communications cost required for route guidance, by not executing route guidance for areas where guidance is unnecessary, or by only executing route guidance for areas where the operator is certain to require guidance.

Moreover, the above-mentioned system also suffers from the following problem. An in-vehicle navigation device generally includes a route pre-guide function where a route guidance is given as if the vehicle is driven following the route, even when the vehicle is not running. Such a route pre-guide function is used for route confirmation before the vehicle is driven, or for demonstration by a dealer or salesman.

However, if it is intended to simply provide the route pre-guiding function on the system, communications equivalent to when vehicle is driven on all the guided route would be generated between the remote and in-vehicle navigation devices, resulting wasteful communications costs. If the route pre-guide function is employed for route confirmation before driving the vehicle or for demonstration at a dealership, incurring communications costs by displaying route guidance as when the vehicle is actually driven is also wasteful.

The present invention is conceived to solve the above-described problems. One object of the present invention is to provide a navigation system, a remote navigation device and method, and an in-vehicle navigation device which can control the transmission of route guidance data to the in-vehicle navigation device, to thereby reduce the communications cost.

SUMMARY OF THE INVENTION

In order to solve the problem described above, according to one aspect of the present invention, there is provided a remote navigation device for transmitting route guidance data to an in-vehicle navigation device, the remote navigation device comprising guide area information obtainer for obtaining guide area information which specifies a map area; route guidance data generating means for generating first route guidance data for the map area specified by the guide area information and second route guidance data for the other map areas, the second route guidance data differing from the first route guidance data in the degree for guidance; and route guidance data transmitting means for transmitting the first and second route guidance data to the in-vehicle navigation device.

According to another aspect of the present invention, there is provided a remote navigation method for transmitting route guidance data to an in-vehicle navigation device, said method comprising a guide area information obtaining step for obtaining guide area information specifying a map area; a route guidance data generating step for generating first route guidance data for the map area specified by the guide area information and second route guidance data for the other map area, the second route guidance data differing from the first route guidance data in the degree of guiding; and a route guidance data transmitting step for transmitting the first and second route guidance data to the in-vehicle navigation device.

According to another aspect of the present invention, there is provided an in-vehicle navigation device characterized in that the device receives first route guidance data for the map area specified by guiding area information and second route guidance data for the other map areas, the second route guidance data differing from the first guiding data in the degree of guiding, and then executes route guidance based on the first and second route guidance data.

According to the present invention, the remote navigation device obtains guide area information, generates first route guidance data for areas specified by the guide area information and second route guidance data for the other areas, the second route guidance data differing from the first route guidance data in the degree of guidance, and transmits the first and second route guidance data to an in-vehicle navigation device. In this manner, when compared to the art described earlier, wherein the same degree of route guidance is executed for all areas from the current position to the destination, the total amount of data in the route guidance data transmitted from the remote navigation device to the in-vehicle navigation device can be decreased by reducing the degree of guidance for a portion of the map area. Consequently, the communications cost can be reduced.

According to another aspect of the present invention, the route guidance data generating means generates route guidance data excluding route guidance for either the map area specified by the guide area information or for all map areas other than that specified by the guide area information. According to this aspect, the route guidance data generated by the remote navigation device excludes either the route guidance for the map area specified by the guide area information or the route guidance for the other map areas. Therefore, by specifying the area where guidance is not needed using the guide area information, route guidance data which does not include the route guidance for that particular area can be transmitted to the in-vehicle navigation device. Alternatively, by specifying the area where guidance is needed using the guide area information, route guidance data can be transmitted to the in-vehicle navigation device which does not include route guidance for areas other than specified. In this manner, the total amount of data for the route guidance data transmitted from the remote navigation device to the in-vehicle navigation device can be reduced.

The guide area information obtaining means may also be configured to receive the guide area information from the in-vehicle navigation device. This facilitates execution of route guidance corresponding to each vehicle.

In a case where the guide area information specifies the area where guidance is not needed, this area where guidance is not needed can be set to, for example, the area near the user's home. In this manner, communications costs can be reduced by avoiding execution of route guidance for the areas around home where route guidance is usually not necessary.

Moreover, the guide area information can be configured to be set based on a history of the routes along which the vehicle has been driven. In this manner, communications cost can be reduced by not executing route guidance for, for example, a route in which the vehicle has been driven for more than predetermined times or a route in which the vehicle is driven in a predetermined period.

According to another aspect of the present invention, there is provided an in-vehicle navigation device for receiving route guidance data from the remote navigation device, the in-vehicle device comprising, guide area information setting means for setting guide area information which specifies a map area, and guide area information transmitting means for transmitting the guide area information to the remote navigation device. According to the in-vehicle navigation device, necessary and sufficient route guidance for each vehicle can be received.

According to another aspect of the present invention, there is provided a navigation system comprising a remote navigation device and an in-vehicle navigation device, in which the in-vehicle navigation device executes route guidance based on route guidance data transmitted from the remote navigation device, wherein, the in-vehicle navigation device includes means for transmitting a route pre-guide request to the remote navigation device, and the remote navigation device, upon receiving the route pre-guide request from the in-vehicle navigation device, transmits route pre-guide data containing guidance content with less information than a route guidance based on the route guidance data, to the in-vehicle device.

According to another aspect of the present invention, there is provided a remote navigation device for transmitting, to an in-vehicle navigation device, route guidance data which forms a basis for route guidance by the in-vehicle navigation device, the remote navigation device comprising route pre-guide request receiving means for receiving a route pre-guide request form the in-vehicle navigation device and route pre-guide data transmitting means for transmitting, upon receiving the route pre-guide request from the in-vehicle navigation device, route pre-guide data which contains guidance content with less information than that in a route guidance based on the route guidance data, to the in-vehicle navigation device.

According to another aspect of the present invention, there is provided a remote navigation method for transmitting, to an in-vehicle navigation device, route guidance data which forms a basis for the in-vehicle navigation device executing route guidance, the method comprising a route pre-guide request receiving step for receiving a route pre-guide request from the in-vehicle navigation device and a route pre-guide data transmitting step for transmitting, upon receiving the route pre-guide request from the in-vehicle navigation device, to the in-vehicle navigation device, route pre-guide data which contains guidance content with less information than route guidance based on the route guidance data.

According to another aspect of the present invention, there is provided an in-vehicle navigation device comprising route guidance data receiving means for receiving route guidance data; route guidance means for executing route guidance using the route guidance data; route pre-guide request transmitting means for transmitting a route pre-guide request to the remote navigation device; route pre-guide data receiving means for receiving route pre-guide data in response to the route pre-guide request, the route pre-guide data containing guidance content with less information than in a route guidance based on the route guidance data; and route pre-guiding means for executing route pre-guide based on the route pre-guide data.

According to the present invention, a route pre-guide can be executed at an in-vehicle navigation device, which is useful for route confirmation by a user and for demonstration by a dealer. The route pre-guide is executed based on the route pre-guide data received from a remote navigation device. The route pre-guide data contains less content than the normal guidance data for the same route.

Upon receiving a route pre-guide request from an in-vehicle navigation device, a remote navigation device transmits, instead of the normal route guidance data, route pre-guide data which contains guidance content with less information. In this manner, a problem in which the same communications costs are incurred for route pre-guide as for normal route guidance can be avoided.

The remote navigation device, when receiving a route pre-guide request, can reduce the amount of data for route guidance data by setting a scale for the route guidance data based on, for example, the distance from the current position of the vehicle to a characteristic point on the guided route. More specifically, the amount of data for the route guidance data can be reduced by, for example, executing more detailed route guidance only when the distance to a guided point is short.

DESCRIPTION OF THE PREFERRED EMBODIMENT

The preferred embodiment of the present invention will now be described in more detail referring to the diagrams.

The entire disclosure of Japanese application No. 2000-287078 filed on Sep. 21, 2000 including specification, claims, drawings and summary are incorporated herein be reference in its entirety.

Figure 1:
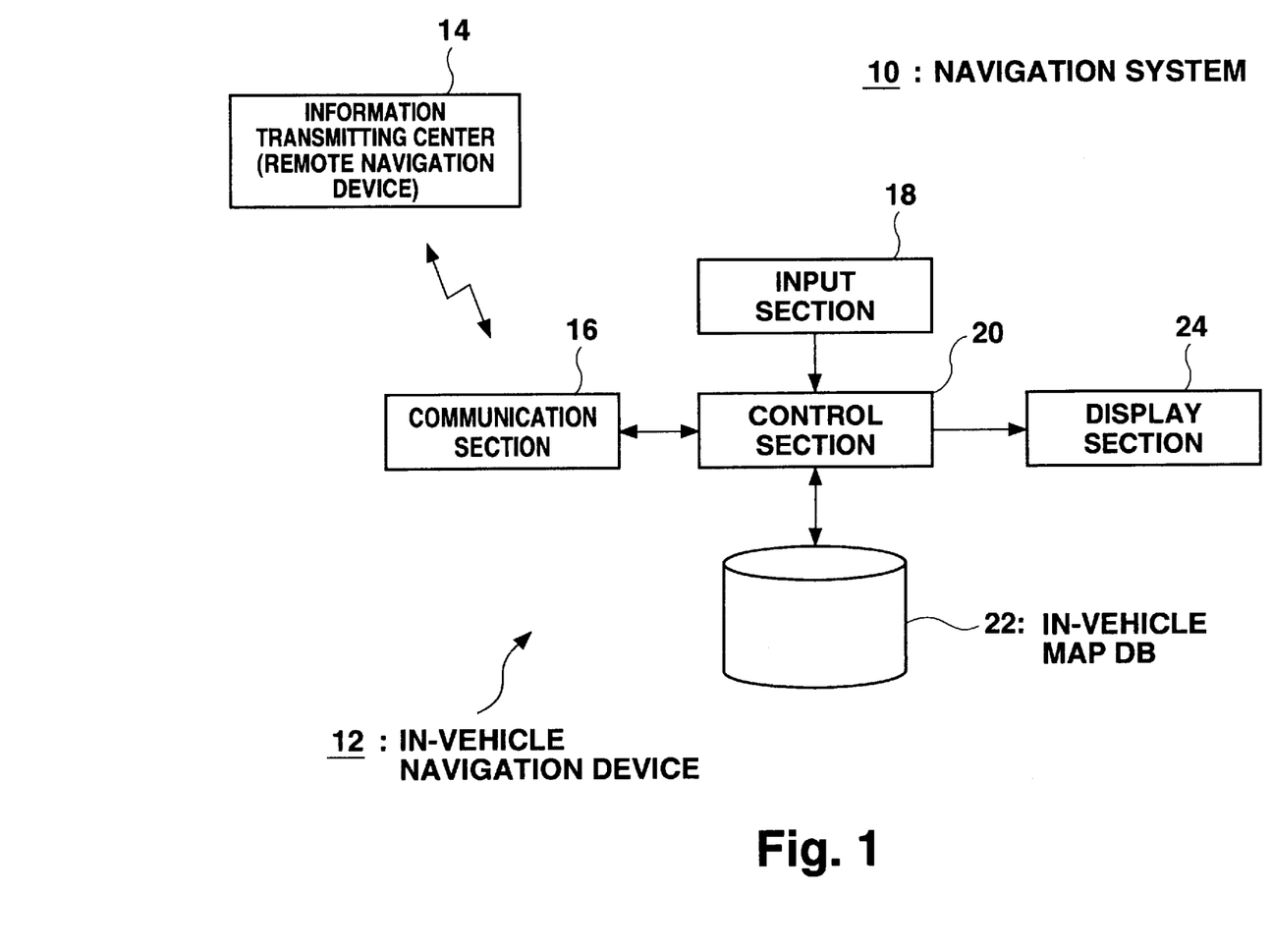
FIG. 1 is a diagram showing an overall configuration of a navigation system according to the present invention.

FIG. 1 shows an overall structure of a navigation system according to a preferred embodiment of the present invention. A navigation system 10 shown in FIG. 1 includes an in-vehicle navigation device 12 and an information transmitting center 14 (remote navigation device). The in-vehicle navigation device 12 includes a communication section 16, an input section 18, a control section 20, an in-vehicle map database (in-vehicle map DB) 22, and a display section 24.

The input section 18 is data inputting means used when requesting a route guidance and a route pre-guide to the information transmitting center 14 or when guide area information is input. The input section 18 may be, for example, a touch panel. The guide area information is information for specifying, for example, areas where guidance is not needed or the areas where guidance is needed. The device is configured so that guide area information is automatically generated with the area around home being the area where guidance is not needed, when a home location is input. It is also possible to generate guide area information by designating an area on a displayed map or by inputting a code for the area, indicating the area as the guide area or the area where guidance is needed. The guide area information is stored at a storing section, not shown.

The display section 24 includes an LCD or the like, and is capable of displaying an in-vehicle map included in the in-vehicle map DB 22 and overlap displaying, on the in-vehicle map, guide information based on route guidance data transmitted from the information transmitting center 14. The communication section 16 includes wireless communication means, such as a mobile telephone device, for executing data communication between the in-vehicle and remote navigation devices 12 and 14.

The control section 20 controls each of the sections of the in-vehicle navigation device 12. In particular, the control section controls each section to transmit route guidance request and guide area information input from the input section 18 to the information transmitting center 14 via the communication section 16, and to display route guidance data, which is the response to the transmitted data, on the display section 24. At this point, guidance based on the route guidance data is displayed superimposed on the in-vehicle map. When a route pre-guide request is input from the input section 18, the request and the guide area information are transmitted to the information transmitting center 14. Route pre-guide data, which is a response to the transmitted data is received at the communication section 16 and displayed as an image on the display section 24. At this point, the route pre-guide is displayed superimposed on the in-vehicle map.

Figure 2:
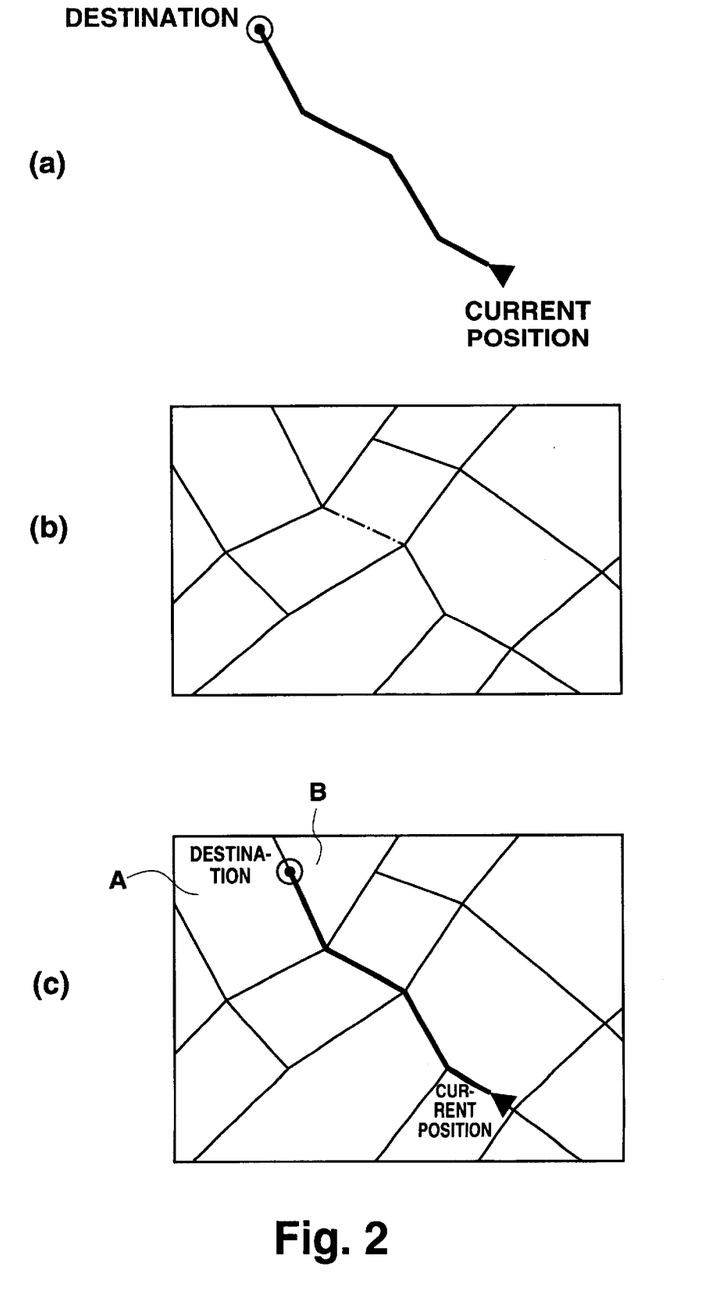
FIG. 2 is a diagram describing steps for generating a guide image.

In other words, with an in-vehicle navigation device 12 according to the example of the preferred embodiment, route guidance data indicating all the guided routes from the current position to the destination as shown in FIG. 2(a) are received from the information transmitting center 14. The route guidance data specifies the form and position (latitude and longitude) of all the guided routes. However, any other formatting of route guidance data is possible, as long as the data format is capable of being displayed on or along with the in-vehicle map. It is also possible to include, in the route guidance data, various information necessary for travelling along the guided routes, for example, information which directs right or left turns at main cross sections, in addition to the information indicating the guided routes.

The in-vehicle map DB 22, on the other hand, stores in-vehicle maps such as the one shown in FIG. 2(b). Similar to the above, any data format can be used as the in-vehicle map data format. The control section 20 reads, upon receiving route guidance data indicating all the guided routes as shown in FIG. 2(a) from the information transmitting center 14, a map in which the guided route is to be overlapped, from the in-vehicle map DB 22, displays the in-vehicle map on the display section 24, and overlap displays the guiding information based on the received route guidance data, on the in-vehicle map. This is shown in FIG. 2(c).

According to such a configuration, by preparing at the information transmitting center 14 the most recent map available, route guidance based on the most recent map can be executed based on the route guidance data transmitted from the information transmitting center 14, even when this most recent map is not available in the in-vehicle map DB 22. For example, the road which is indicated by a dotted line in FIG. 2(b) is not recorded in the in-vehicle map DB 22. However, by superimposing guided routes shown in FIG. 2(a) on the map shown in FIG. 2(b) to produce a guided map image as shown in FIG. 2(c) on the display section 24, route guidance can be enabled even for the roads that are not present in the in-vehicle map DB 22.

While an example is described in which the route guidance data on all the guided route from the current position to the destination is transmitted to the in-vehicle navigation device 12 at once, it is also possible to divide the data and transmit the divided data in units based on the current position of the vehicle.

Figure 3:
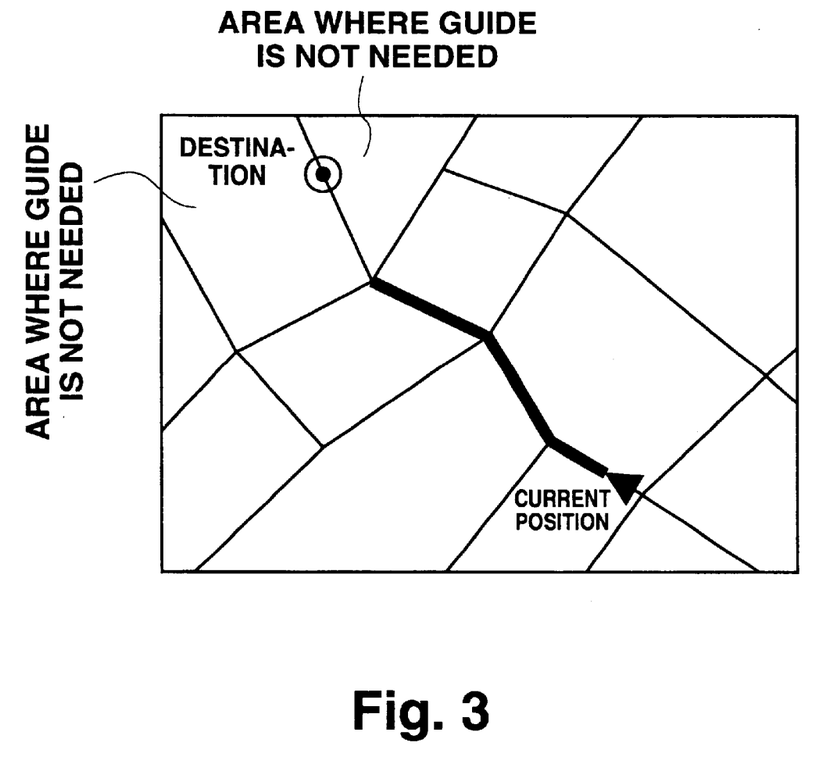
FIG. 3 is a diagram showing route guidance with route guidance for certain map areas omitted based on guide area information.

One of the characteristics of a navigation system 10 having such a configuration is that unnecessary guidance is deleted when route guidance data is generated at the information transmitting center 14. For example, if guide area information is set indicating that areas A and B in FIG. 2 are areas where guidance is not necessary, guidance for roads going through these areas A or B is omitted from the route guidance data, and only route guidance data for other guided routes is transmitted to the in-vehicle navigation device 12 as shown in FIG. 3.

Figure 4:
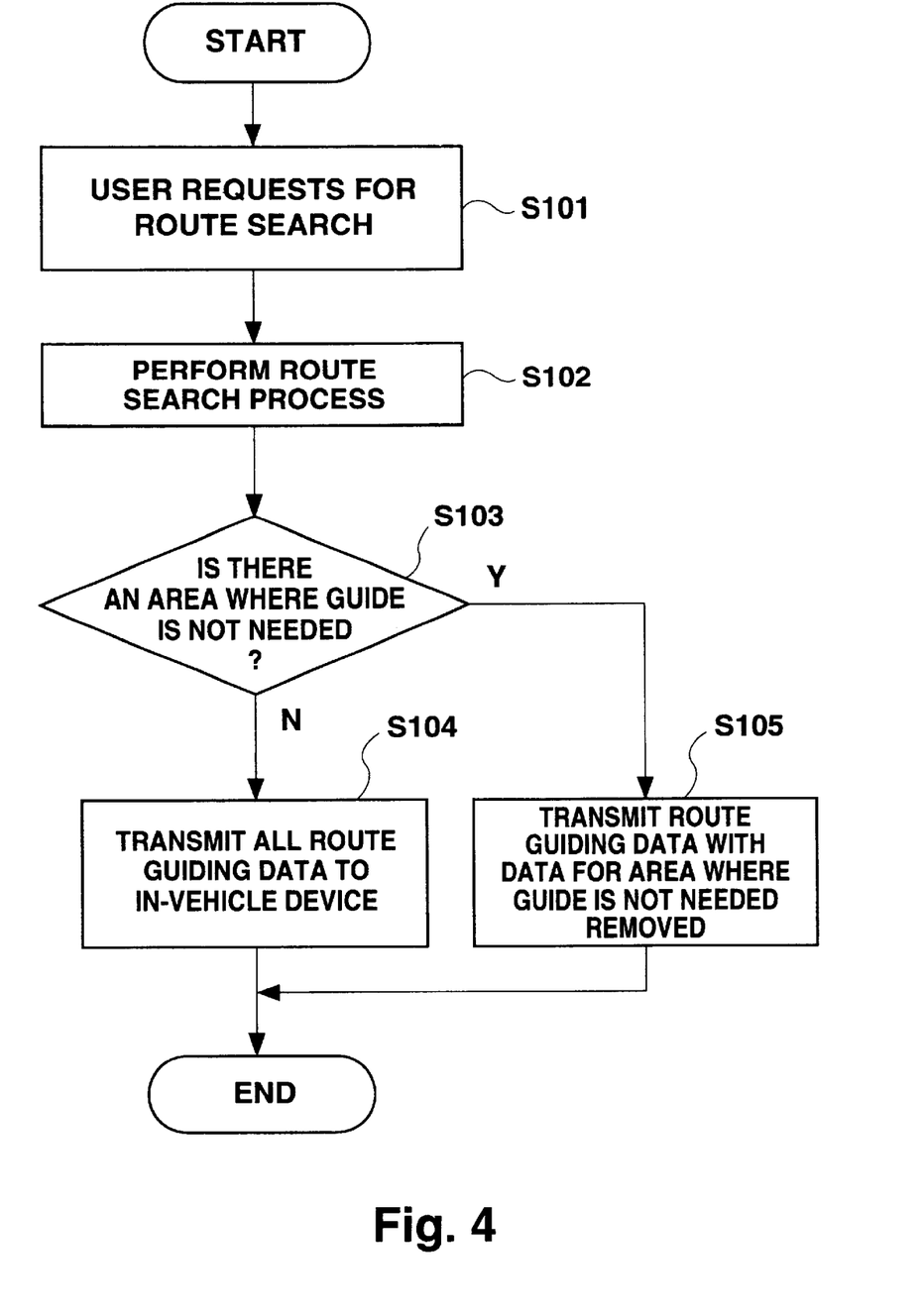
FIG. 4 is a flowchart describing the process at the information transmitting center for normal route guidance.

FIG. 4 is a flowchart showing the process at the information transmitting center 14 when a route search request is received from an in-vehicle navigation device 12. As shown in the figure, upon receiving a route search request from an in-vehicle navigation device 12 (step S101), the information transmitting center 14 performs route search processing based on a remote map DB provided at the information center 14 (step S102). Then, the information transmitting center 14 judges whether or not a no-guide area where guidance is not necessary has been set for the in-vehicle navigation device 12 (step S103). In other words, in the navigation system 10, at S101, along with a route search request, the information transmitting center 14 also receives guide area information. In the process at step S103, it is judged whether or not the guide area information specifies an area where guidance is not needed. When the guide area information does specify area where guidance is not needed, routes or route sections through the no-guide area are removed from the guided routes to be searched at step S102. Route guidance data for the remaining routes is generated and transmitted to the in-vehicle navigation device 12 (step S105). If, on the other hand, it is judged that there is no area where guide is not needed at step S103, all route guidance data obtained at step S102 is transmitted to the in-vehicle navigation device 12 (step S104). In this manner, it is possible to avoid transmission to the in-vehicle navigation device 12 of route guidance data for routes or route sections through an area designated as area where guidance is not necessary by the route search request transmitted from the in-vehicle navigation device 12. As a result, the total amount of data in the route guidance data transmitted from the information transmitting device 14 to the in-vehicle navigation device 12 can be reduced, and, as a result, the communications costs can also be reduced.

In the above description, route guidance data is generated for not executing route guidance for the area where guide is not needed. It is also possible, however, to generate route guidance for only the area where route guidance is needed and to transmit only that route guidance data to the in-vehicle navigation device 12. In this case, the route search request transmitted from the in-vehicle navigation device 12 to the information transmitting center 14 includes guide area information specifying the area where guidance is needed. Then, only the routes or sections passing through the area where guidance is needed are extracted from all of the guided routes obtained at step S102, and the route guidance data corresponding to just these routes is transmitted to the in-vehicle navigation device 12. In this manner, only the necessary route guidance data is transmitted to the in-vehicle navigation device 12.

Moreover, in the above description, it is configured that the guide area information specifies either the area where guide is not needed or the area where guide is needed, and it is judged either to execute the route guidance or not to execute the route guidance for the areas specified by the guide area information. It is also possible to generate route guidance data for executing varying degrees of route guidance for areas specified by the guide area information, and to transmit the generated route guidance data to the in-vehicle navigation device 12. For example, route guidance data for simplified route guidance can be transmitted to the in-vehicle navigation device 12 for areas close to the user's home, and normal route guidance data can be transmitted to the in-vehicle navigation device 12 for the other areas. As with the earlier example, this configuration also allows for reduction of the total amount of data in the route guidance data transmitted to the in-vehicle navigation device 12, and also results in reduction in communications costs.

The guide area information can be obtained at the information transmitting center 14 by various methods. For example, in addition to a method of using guide area information transmitted from the in-vehicle navigation device, there is also a method of pre-setting guide area information for a vehicle which is to be guided, and generating route guidance data based on the guide area information. Moreover, there is also a method for dynamically generating guide area information. That is, the in-vehicle navigation device 12 can be configured to record a history of the routes traveled by the vehicle, and either the information transmitting center 14 or the in-vehicle navigation device 12 can set guide area information based on the vehicle travel history so that route guidance is not provided for the areas in which the vehicle is frequently driven based on the record of the running history. For example, areas where the vehicle was driven during a predetermined period, or the area where the vehicle was driven more than a certain number of times can be set as areas where guidance is not needed. When the guide area information is set at the in-vehicle navigation device 12, the information is transmitted to the information transmitting center 14. In this manner, it is possible to reduce the amount of data in the route guidance data transmitted from the information transmitting center 14 to the in-vehicle navigation device 12.

Figure 5:
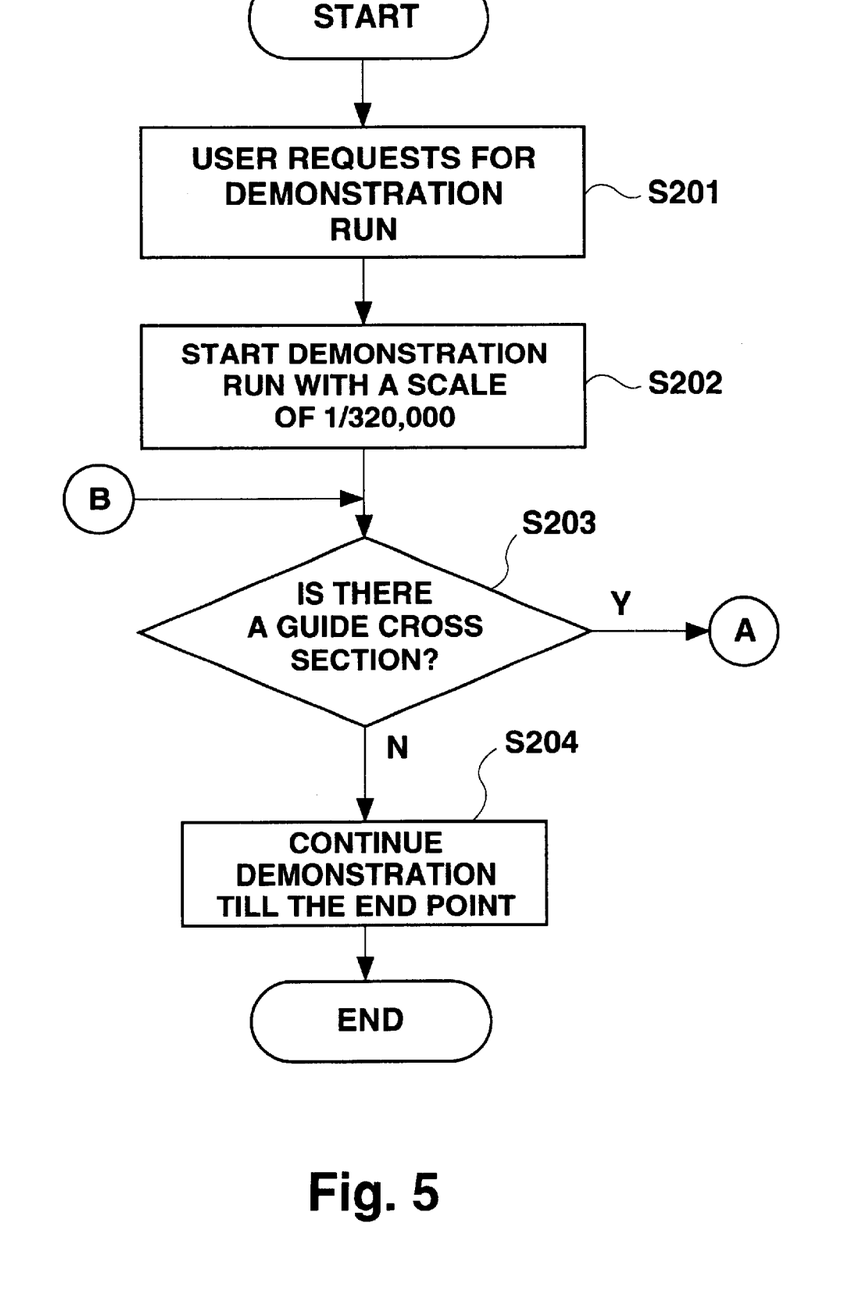
FIGS. 5 and 6 are flowcharts describing the process at the information transmitting center for route pre-guide.
Figure 6:
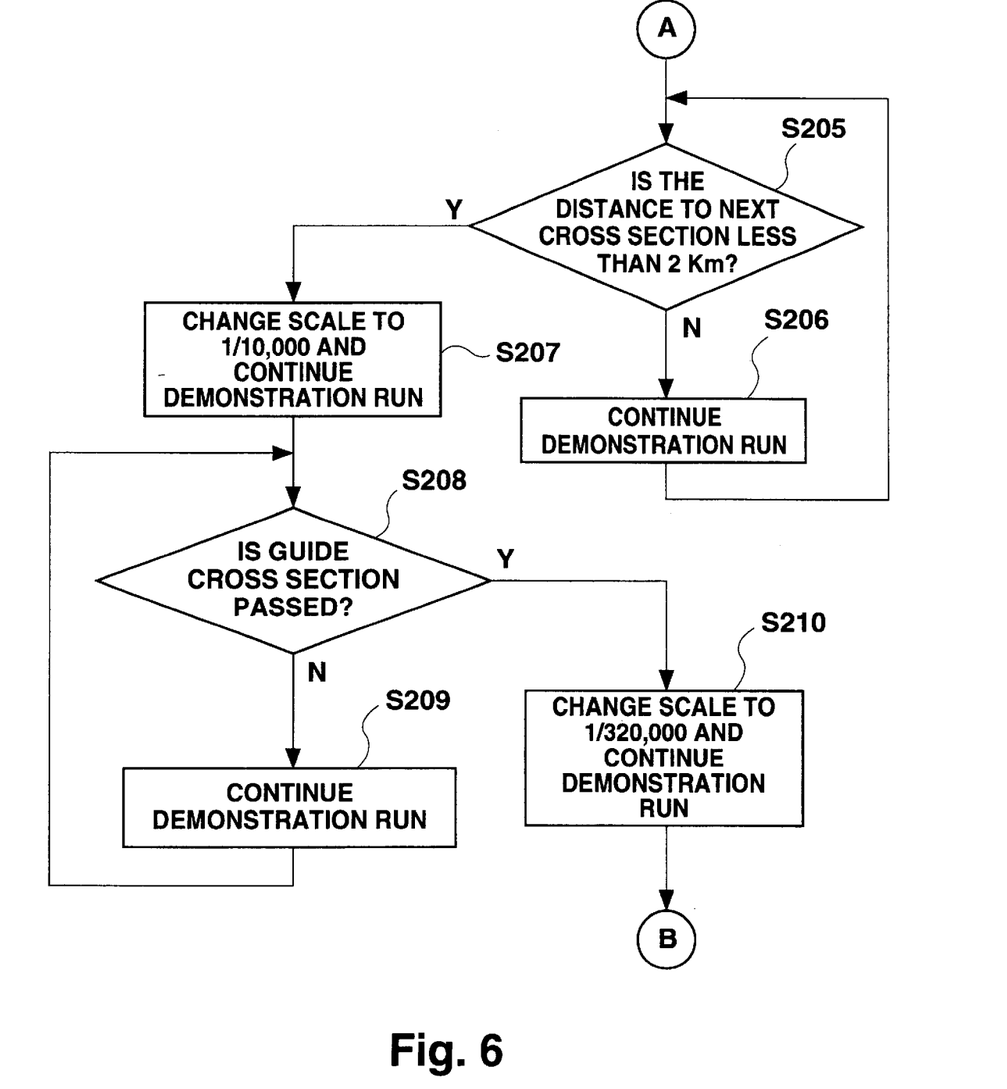

Next, the route pre-guide in the navigation system 10 according to the present embodiment will be described. FIGS. 5 and 6 are flowcharts for describing the route pre-guide process of the information transmitting center 14 in the navigation system 10. Referring to FIG. 5, when a route pre-guide (demonstration run) is transmitted from an in-vehicle navigation device to the information transmitting center 14 (step S201), the information transmitting center 14 transmits 1/320,000 scale route guidance data to the in-vehicle navigation device 12 (step S202). Then, when there are no guide cross sections (step S203), the demonstration run is continued to the end point (destination) (step S204), and the route pre-guide is completed.

If, on the other hand, it is judged that there is a guide cross section at step S203, the information transmitting center 14 judges whether or not the distance to the next guide cross section is equal to or less than 2 km (step S205). If the distance is greater than 2 km, route pre-guide is continued with a 1/320,000 scale route guidance data transmitted to the in-vehicle navigation device 12, similar to step S202 (step S206). If it is judged that the distance to the next guide cross section is less than or equal to 2 km at step S205, the information transmitting center 14 generates 1/10,000 scale route guidance data, and continues the route pre-guide by transmitting the data to the in-vehicle navigation device 12 (step S207). Then, until the guide cross section is passed (step S208), the route pre-guide using route guidance data with a scale of 1/10,000 is continued (step S209). When the guide cross section is passed, similar to step S202, the information transmitting center 14 generates 1/320,000 scale route guidance data and continues route pre-guide at the in-vehicle navigation device 12 by transmitting the route guidance data to the in-vehicle navigation device 12 (step S210). The process then returns to step S203.

In other words, in the navigation system 10 according to the present embodiment, by setting the display scale to be wider when the length of the distance to the next guide cross section, communications costs can be controlled without degradation of the apparent route display quality. By only displaying the route with a detailed scale equivalent to a typical related navigation device when approaching a guide cross section, the original object of route confirmation can be achieved.

In the above description, the system is configured to change the display scale based on the distance to the next guide cross section. However, it is also possible to control the display scale based on road type, such as making the display scale wider for highways and more detailed for city streets. Moreover, instead of controlling the display scale, it is also possible to change the number of guide items. For example, the areas around guide cross sections can be guided with a display and a voice, whereas the other areas can be guided only with the display guides.

In other words, the information transmitting center 14 can be configured so that when it receives a route pre-guide request, it transmits route guidance data having guide contents with less information than the route guidance data which is transmitted to the in-vehicle navigation device 12 when a normal route guidance request is received for the same route. In this manner, it is possible to reduce the communications costs required for route pre-guide.

What is claimed is:

1. A remote navigation device for transmitting route guidance data to an in-vehicle navigation device, said remote navigation device comprising:

guide area information obtaining means for obtaining guide area information which specifies a map area, route guidance data generating means for generating first route guidance data for the map area specified by said guide area information and second route guidance data for map areas other than the map area specified by said guide area information, said second route guidance data differing from said first route guidance data in the degree of guidance, and route guidance data transmitting means for transmitting said first and second route guidance data to said in-vehicle navigation device.

2. A remote navigation device according to claim 1, wherein, said route guidance data generating means generates route guidance data excluding route guidance for either the map area specified by said guide area information or the map area not specified by said guide area information.

3. A remote navigation device according to claim 1, wherein said guide area information obtaining means receives said guide area information from said in-vehicle navigation device.

4. A remote navigation device according to claim 1, wherein said guide area information is information specifying an area around the user's home.

5. A remote navigation device according to claim 1, wherein, said guide area information is set based on the vehicle's driving history.

6. A navigation system including a remote navigation device and an in-vehicle navigation device, in which said in-vehicle navigation device executes route guidance based on route guidance data transmitted from said remote navigation device, wherein, said in-vehicle navigation device includes means for transmitting a route pre-guide request to said remote navigation device, and said remote navigation device, upon receiving said route pre-guide request from said in-vehicle navigation device, transmits route pre-guide data to said in-vehicle navigation device, said route pre-guide data including guidance content with less information than does a route guidance based on said route guidance data.

7. A navigation system according to claim 6, wherein, said remote navigation device, upon receiving said route pre-guide request, reduces the amount of data in route guidance data by setting a scale for said route guidance data based on a distance from the current position of the vehicle to a characteristic point along the guided route.

8. An in-vehicle navigation device for receiving route a guidance data from a remote navigation device according to claim 1, said in-vehicle navigation device comprising, guide area information setting means for setting guide area information for specifying a map area, and guide area information transmitting means for transmitting said guide area information to said remote navigation device.

9. Method for transmitting route guidance data to an in-vehicle navigation device, said method comprising:

obtaining guide area information which specifies a map area where route guidance is not needed, generating first route guidance data for the map area specified by said guide area information and second route guidance data for the map area not specified by said guide area information, said first and second route guidance data differing in the degree of guidance, and transmitting said first and second route guidance data to said in-vehicle navigation device.

10. A remote navigation device for transmitting route guidance data to an in-vehicle navigation device, said route guidance data being useable as a basis for route guidance at said in-vehicle navigation device, said remote navigation device comprising, route pre-guide request receiving means for receiving a route pre-guide request from said in-vehicle navigation device, and route pre-guide data transmitting means for transmitting, upon receiving a route pre-guide request from said in-vehicle device, to said in-vehicle navigation device, route pre-guide data containing less guidance content than contained in route guidance based on said route guidance data.

11. Method for transmitting route guidance data to an in-vehicle navigation device, said route guidance data being useable as a basis for execution of route guidance by said navigation device, said method comprising:

receiving a route pre-guide request from said in-vehicle navigation device, and transmitting, upon receiving said route pre-guide request from said in-vehicle navigation device, to said in-vehicle navigation device, route pre-guide data which contains less guidance content than route guidance based on said route guidance data.

12. An in-vehicle navigation device, comprising:

route guidance data receiving means for receiving route guidance data, route guidance means for executing route guidance using said route guidance data, route pre-guide request transmitting means for transmitting a route pre-guide request to a remote navigation device, route pre-guide data receiving means for receiving, in response to said route pre-guide request, a route pre-guide data containing less guidance content than route guidance based on said route guidance data, and route pre-guidance means for executing route pre-guide based on said route pre-guide data.

13. A remote navigation device which transmits route guidance data to an in-vehicle navigation device, said remote navigation device comprising:

guide area information obtainer which obtains guide area information which specifies a map area, route guidance data generator which generates first route guidance data for the map area specified by said guide area information and second route guidance data for map areas other than the map area specified by said guide area information, said second route guidance data differing from said first route guidance data in the degree of guidance, and route guidance data transmitter which transmits said first and second route guidance data to said in-vehicle navigation device, wherein said guide area information is set based on a vehicle driving history.

14. A remote navigation device according to claim 13, wherein, said route guidance data generator generates route guidance data excluding route guidance for either the map area specified by said guide area information or the map area not specified by said guide area information.

15. A remote navigation device according to claim 13, wherein said guide area information obtainer receives said guide area information from said in-vehicle navigation device.

16. A remote navigation device according to any claim 13, wherein said guide area information is information specifying an area around the user's home.

17. A navigation system including a remote navigation device and an in-vehicle navigation device, in which said in-vehicle navigation device executes route guidance based on route guidance data transmitted from said remote navigation device, wherein, said in-vehicle navigation device includes transmitter which transmits a route pre-guide request to said remote navigation device, and said remote navigation device, upon receiving said route pre-guide request from said in-vehicle navigation device, transmits route pre-guide data to said in-vehicle navigation device, said route pre-guide data including guidance content with less information than does a route guidance based on said route guidance data.

18. A navigation system according to claim 17, wherein, said remote navigation device, upon receiving said route pre-guide request, reduces the amount of data in route guidance data by setting a scale for said route guidance data based on a distance from the current position of the vehicle to a characteristic point along the guided route.

19. An in-vehicle navigation device which receives route guidance data from a remote navigation device according to claim 1, said in-vehicle navigation device comprising, guide area information setter which sets guide area information which specifies a map area, and guide area information transmitter which transmits said guide area information to said remote navigation device.

20. A remote navigation device which transmits route guidance data to an in-vehicle navigation device, said route guidance data being useable as a basis for route guidance at said in-vehicle navigation device, said remote navigation device comprising, route pre-guide request receiver which receives a route pre-guide request from said in-vehicle navigation device, and route pre-guide data transmitter which transmits, upon receiving a route pre-guide request from said in-vehicle device, to said in-vehicle navigation device, route pre-guide data containing less guidance content than contained in route guidance based on said route guidance data.

21. An in-vehicle navigation device, comprising:

route guidance data receiver which receives route guidance data, route guidance portion which executes route guidance using said route guidance data, route pre-guide request transmitter which transmits a route pre-guide request to a remote navigation device, route pre-guide data receiver which receives, in response to said route pre-guide request, a route pre-guide data containing less guidance content than route guidance based on said route guidance data, and route pre-guide portion which executes route pre-guide based on said route pre-guide data.

* * * * *